United States Patent
Miller

(10) Patent No.: US 8,401,467 B2
(45) Date of Patent: Mar. 19, 2013

(54) FLEXIBLE COVERAGE AREAS FOR RETURN LINK SIGNALS IN A SPOT BEAM SATELLITE COMMUNICATION SYSTEM

(75) Inventor: Mark Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 13/019,842

(22) Filed: Feb. 2, 2011

(65) Prior Publication Data
US 2011/0189947 A1   Aug. 4, 2011

Related U.S. Application Data

(60) Provisional application No. 61/301,164, filed on Feb. 3, 2010.

(51) Int. Cl.
*H04B 7/185* (2006.01)

(52) U.S. Cl. .................................................. 455/12.1
(58) Field of Classification Search ................ 455/12.1
See application file for complete search history.

(56) References Cited

U.S. PATENT DOCUMENTS

| | | | |
|---|---|---|---|
| 5,995,495 A * | 11/1999 | Sampson | 370/316 |
| 6,442,148 B1 | 8/2002 | Adams et al. | |
| 7,099,624 B1 | 8/2006 | Sherman | |
| 2006/0046638 A1 * | 3/2006 | Takeuchi et al. | 455/3.02 |
| 2010/0120356 A1 * | 5/2010 | Jin et al. | 455/7 |

OTHER PUBLICATIONS

Tanaka M et al: "Experimental Fixed and Mobile Multibeam Satellite Communications System" NTT Radio Communication System Laboratories, 1-2356 Take. Yokosuma, Kanagawa, Japan 238-03, Jun. 11, 1989, pp. 1587-1594, 8 pages.
European Search report for European Application No. 11002789.3, mailed on Jun. 5, 2012, 7 pages.

* cited by examiner

*Primary Examiner* — Yuwen Pan
*Assistant Examiner* — Ankur Jain
(74) *Attorney, Agent, or Firm* — Kilpatrick Townsend & Stockton LLP

(57) ABSTRACT

Conventional spot beam satellites receive return uplink beam signals that each correspond to a separate and unique return downlink beam. An embodiment of the invention allows flexible coverage areas by selectively attenuating and combining multiple return uplink beam signals and transmitting them on a single beam to a gateway terminal. This allows uplink capacity to be dynamically allocated amongst different uplink signals. Offered load in different beams can be predicted and used to set the attenuation values appropriately and the attenuation values may also be controlled remotely.

6 Claims, 4 Drawing Sheets

Beam capacity adjustment: East Coast Primetime

Beam capacity adjustment: West Coast Primetime

FLEXIBLE COVERAGE AREAS FOR RETURN LINK SIGNALS IN A SPOT BEAM SATELLITE COMMUNICATION SYSTEM

CROSS-REFERENCES TO RELATED APPLICATIONS

The present application claims benefit of priority under 35 U.S.C. §119(e) of U.S. Provisional Application No. 61/301,164, filed Feb. 3, 2010, titled "Flexible Coverage Areas for a Spot Beam Satellite Communications System—Forward and Return Link," the content of which is incorporated herein by reference in its entirety for all purposes.

The present application is filed concurrently with U.S. Nonprovisional patent application Ser. No. 13/019,841, filed Feb. 2, 2011, titled "Flexible Coverage Areas for Forward Link Signals in a Spot Beam Satellite Communication System,"the content of which is incorporated herein by reference in its entirety for all purposes.

FIELD OF THE INVENTION

The present invention relates generally to satellite communications systems. More particularly, the present invention relates to methods and apparatuses for providing dynamic power distribution for return link signals at a spot beam satellite.

BACKGROUND

Spot beam satellites are effective for the transmission and reception of unicast and multicast data. In typical spot beam satellites, many smaller spot beams are used to provide coverage for a larger area that is defined by the union of the areas covered by each of the smaller spot beams. An example is depicted in FIGS. 1A-1C, which show how a number of spot beams, such as individual spot beam 102, provide satellite coverage over a large coverage area 104.

FIG. 2 is a simplified diagram of a return link of a typical bent pipe spot beam satellite system using a hub-spoke architecture. The depicted hardware connects one user beam to a gateway (GW) terminal. Multiple user terminals (UT's) 207 in a user beam 208 transmit data through a satellite 206 down to a GW terminal 226 in a GW beam 224. The bent pipe spot beam satellite 206 in this example is simplified but shows key elements of one return link signal pathway including a receive (Rx) antenna 212, a low noise amplifier (LNA) 214, a frequency converter 216, a high power amplifier (HPA) 218, and a transmit (Tx) antenna 220. Many UT's 207 can operate in the same user beam 208 by transmitting on the same frequency at different times (e.g., TDMA) or on different frequencies at the same time (e.g., FDMA). Return uplink signal 210 can then be a composite signal containing transmissions from a number of user terminals 207. A typical satellite 206 can have a number of these sets of pathway hardware connecting a number of user beams to a number of GW's.

A single user spot beam 208, as shown in FIG. 2, typically covers a small subset of a desired coverage area. Many user spots beams are employed in a manner similar to that depicted in FIG. 1 to provide service to a larger coverage area. Each of the spot beams is serviced by a GW terminal, and many spot beams may be serviced by the same GW terminal by use of different frequencies and/or polarizations. The total coverage area is the union of the areas covered by the individual user spot beams. This coverage area is the region where satellite service can be offered to customers. This coverage area is fixed and is selected during a satellite design process.

Satellite procurement, design, construction, launch, and test is a lengthy process. This process typically takes up to four years or more. The coverage area must be specified very early on in this process. In many instances, the desired coverage area is not well known at these early stages of satellite design. An educated guess must be made as to where the best coverage areas might be. If one chooses incorrectly, a coverage area may be selected that has few potential customers and/or a coverage area may be selected that does not include regions having many potential customers. These are clearly undesirable consequences.

This problem is further complicated by the long operational lifetime of satellites. Satellites typically have an operational lifetime of 15 years or more. During this time, target services areas can change dramatically. This can occur due to the development of ground infrastructure (e.g., wireless and fiber network build outs), re-purposing of the satellite, movement of the satellite to a different orbit slot, and the like. The satellite spot beams, however, and thus the coverage areas, are fixed in location and typically cannot be modified despite these changes.

Further, offered load at different spot beams can vary dramatically over short time periods. For example, a satellite system that covers the continental United States may experience busy hours on the East Coast that correspond to non-busy hours on the West Coast.

Thus, there is a need for improved spot beam satellites that allow for modification of capacity and coverage areas to adjust to short term demands and also throughout the operational lifetime of the satellite.

SUMMARY

Some embodiments of the present invention provide methods and apparatuses for providing flexible coverage areas and flexible capacity for return link signals at a spot beam satellite. This can allow coverage areas to be defined later in the design process and allow coverage areas and capacity to be changed during the operational lifetime of the satellite.

In accordance with an embodiment of the invention, a method for providing dynamic power distribution for return link signals at a spot beam satellite includes receiving a plurality of return link signals each from a spot beam corresponding to a spot beam coverage area, and selectively attenuating at least one of the plurality of return link signals. The step of selectively attenuating may be achieved by remotely controlling attenuation values from a location away from the spot beam satellite after the spot beam satellite has been deployed in space. The method also includes, after the step of selectively attenuating, combining the plurality of return link signals to generate a combined signal, amplifying the combined signal to generate an amplified signal, and transmitting the amplified signal to a gateway.

In accordance with another embodiment of the invention, a method for providing dynamic power distribution for return link signals at a spot beam satellite includes receiving one or more attenuation values from a location away from the spot beam satellite, and setting an attenuation of one or more attenuators based on the one or more attenuation values. The method also includes receiving a plurality of return link signals, each from a spot beam corresponding to a spot beam coverage area, and attenuating at least one of the plurality of return link signals using the one or more attenuators. The method also includes combining the plurality of return link signals to generate a combined signal, amplifying the combined signal to generate an amplified signal, and transmitting the amplified signal to a gateway.

In accordance with yet another embodiment of the invention, a spot beam satellite for providing flexible coverage areas for return link signals includes one or more antennas configured to receive a plurality of return link signals, each from a spot beam corresponding to a spot beam coverage area, and one or more programmable attenuators configured to attenuate at least one of the plurality of return link signals. The spot beam satellite also includes a summing device configured to combine the plurality of return link signals to generate a combined signal, an amplifier configured to amplify the combined signal to generate an amplified signal, and a transmitter configured to transmit the amplified signal to a gateway.

Numerous benefits are achieved using the present invention over conventional techniques. For example, in one embodiment programmable attenuators at a spot beam satellite are used to selectively attenuate return link signals. The selective attenuation can distribute G/T reduction across beams within a beam group. This can increase the effective coverage area of the spot beam satellite. This can also selectively turn one or more beams "on" while turning other beams "off". Depending upon the embodiment, one or more of these benefits may exist. These and other benefits are described throughout the specification and more particularly below.

BRIEF DESCRIPTION OF THE DRAWINGS

An understanding of the nature and advantages of the present invention may be realized by reference to the following drawings. In the drawings, similar components or features may have the same reference label. Further, various components of the same type may be distinguished by following the reference label with a second label that distinguishes among the similar components. If only the first reference label is used in the specification, the description is applicable to any one of the similar components having the same reference label irrespective of the second reference label.

DETAILED DESCRIPTION

Some embodiments of the present invention provide methods and apparatuses for providing flexible coverage areas and flexible capacity for return link signals at a spot beam satellite. In one embodiment, for example, programmable attenuators at are used to distribute G/T reduction across beams within a beam group. This can be used to increase the effective coverage area of the spot beam satellite and/or to selectively turn one or more beams "on" while turning other beams "off".

Figure 1A:
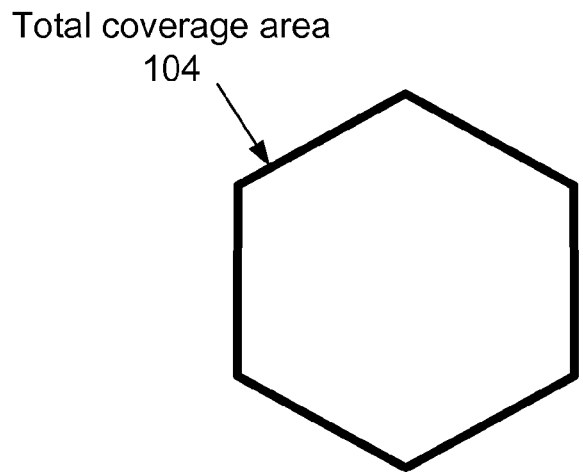
FIGS. 1A-1C are simplified diagrams showing how a number of spot beams provide satellite coverage over a large coverage area.
Figure 1B:
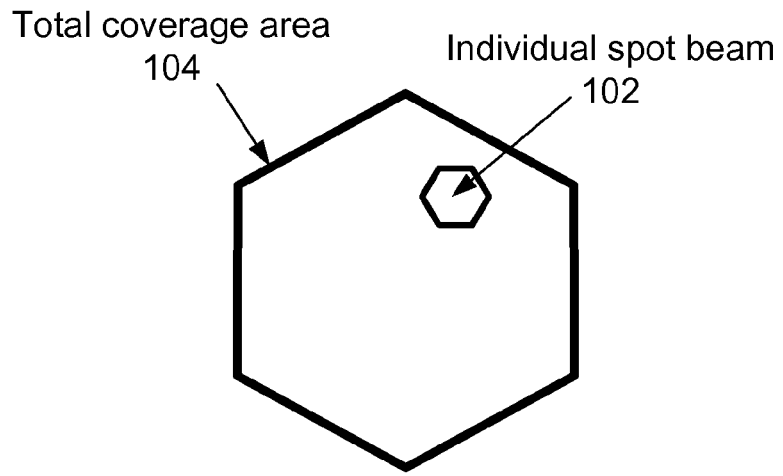
Figure 1C:
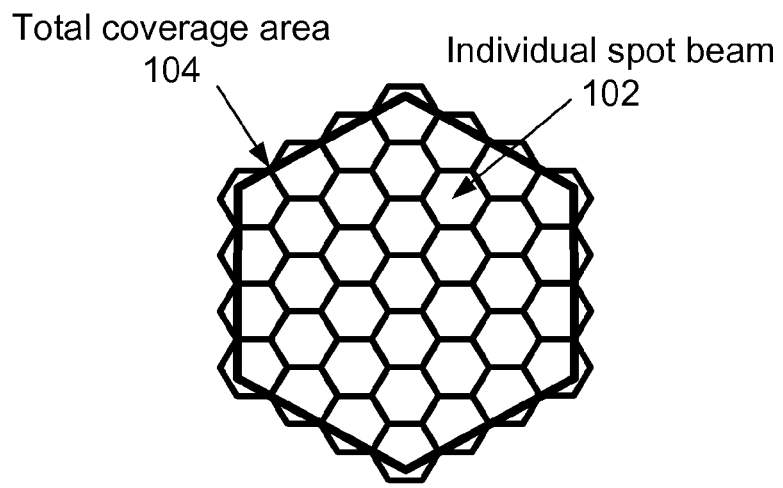
Figure 2:
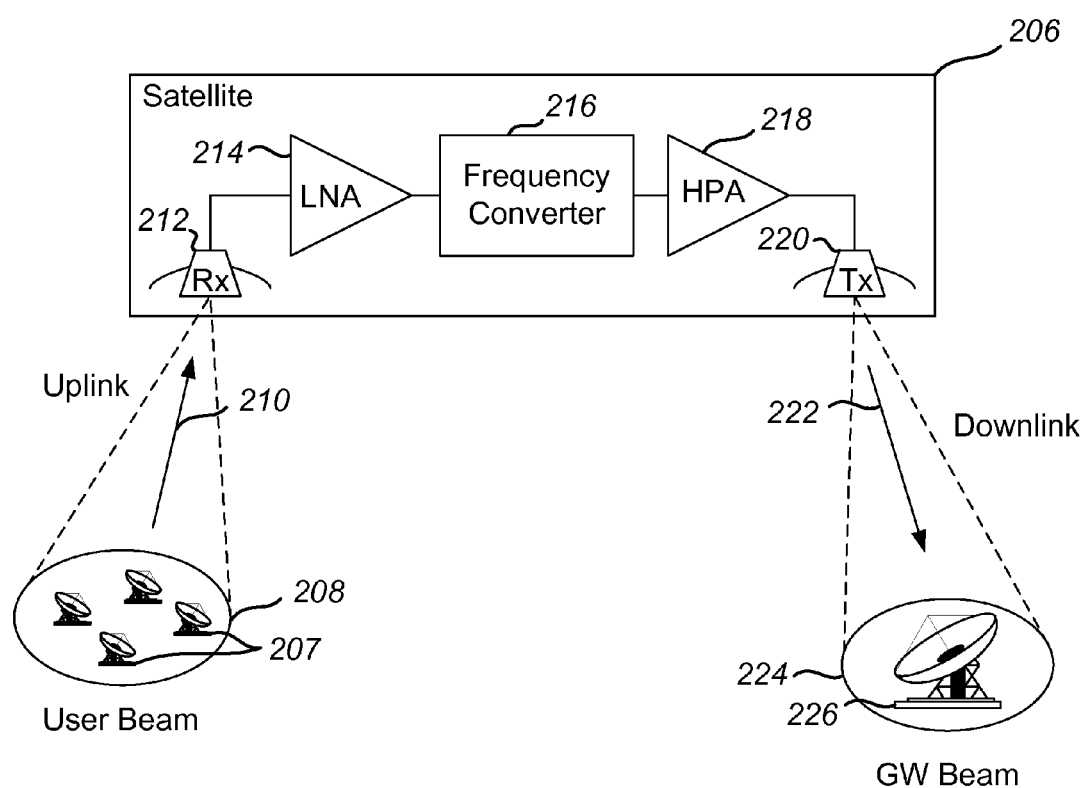
FIG. 2 is a simplified diagram of a return link of a typical bent pipe spot beam satellite system using a hub-spoke architecture.
Figure 3:
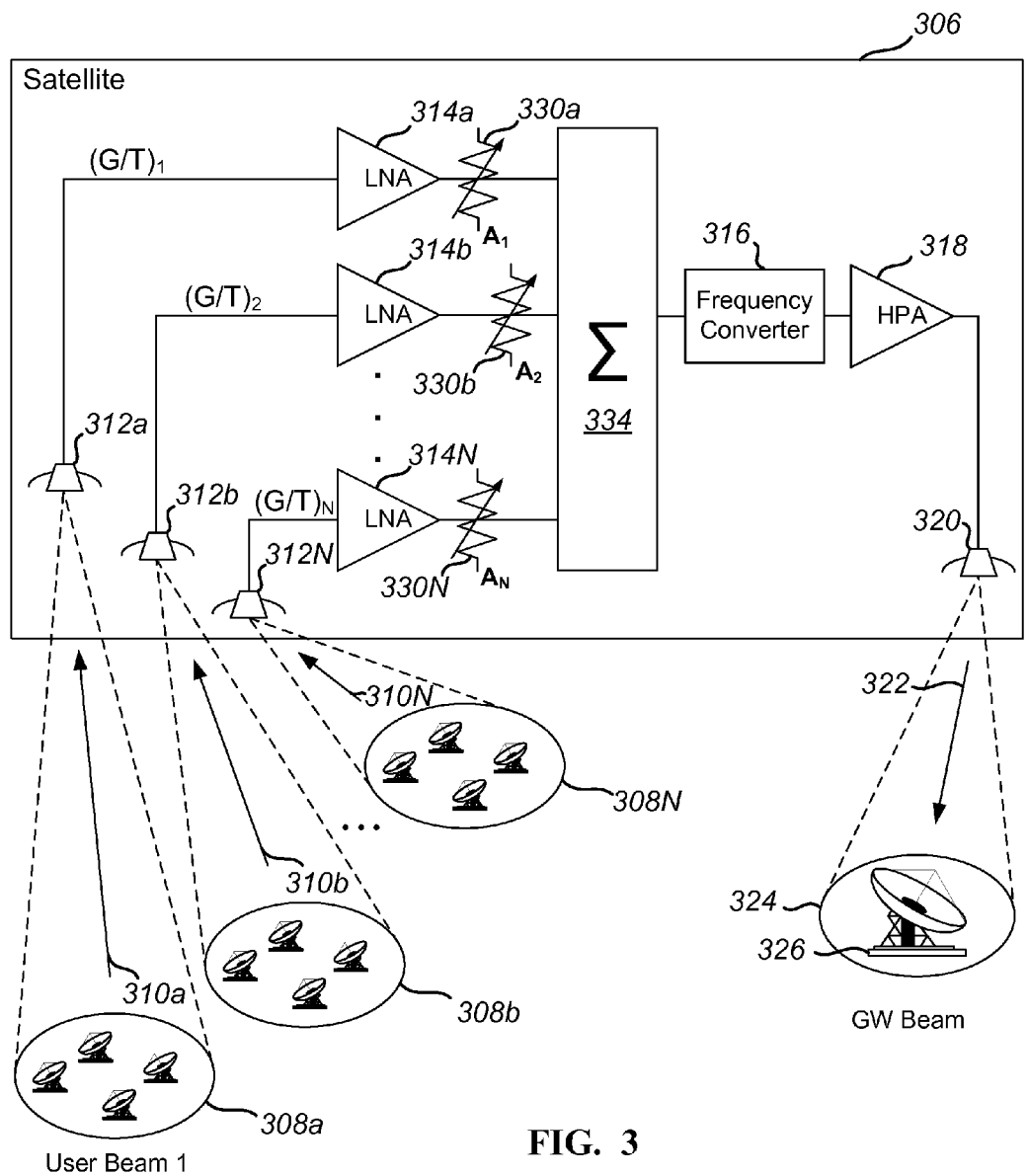
FIG. 3 is a simplified diagram of a return link of a spot beam satellite in accordance with an embodiment of the invention.

FIG. 3 is a simplified diagram of a return link of a spot beam satellite in accordance with an embodiment of the invention. This figure shows a group of N user beams 308a, 308b, . . . 308N (where N=3, 4, . . . ) connected to a GW terminal 326 through a satellite 306 via uplink signals 310a, 310b, . . . 310N respectively. In an embodiment, the N user beams 308a, 308b, . . . 308N may use the same spectrum. The N user beams 308a, 308b, . . . 308N can be formed via the same satellite Rx antenna and different feeds or they can be formed by different Rx antennas 312a, 312b, . . . 312N. Furthermore, the size of the reflectors used to form the N beams 308a, 308b, . . . 308N, and hence the antenna directivity, need not be the same for each of the beams. The output of each of the Rx feeds $(G/T)_1, (G/T)_2, \ldots (G/T)_N$ provide power from their respective beams to LNA's 314a, 314b, . . . 314N. Outputs of each LNA 314 can be individually attenuated by respective programmable attenuators 330a, 330b, . . . 330N. Values for the programmable attenuators 330a, 330b, . . . 330N can be uplinked to the satellite 306 via a command link that originates from a remote location (e.g., a control station). A command receiver and control processor (not shown) on the satellite 306 can receive the attenuator values and set the programmable attenuators 330a, 330b, . . . 330N accordingly. Outputs from programmable attenuators 330a, 330b, . . . 330N can be summed using summing device 334. Output of the summing device 334 may be converted to a downlink frequency at frequency converter 316, amplified at HPA 318, and transmitted to the GW via a downlink signal 322 using Tx antenna 320.

The N user beams 308a, 308b, . . . 308N form a beam group. The location of each of the beams in the beam group may be fixed and selected during the design phase of the satellite. The flexibility within the beam group comes from the programmable attenuation values $A_1$ through $A_N$. A particular beam n can effectively be turned "on" and the other N-1 beams turned "off" by setting $A_n$ equal to unity (minimum attenuation) and all other attenuators to a maximum attenuation value (a very large value for A). Since each of the N beams within the beam group may use the full beam spectrum, any one of the N beams may be connected to the GW at any time during the satellite lifetime. This can increase the possible coverage areas by a factor of N without decreasing the amount of spectrum per beam, increasing the number of gateways, or increasing the number of frequency converters and HPA's on the satellite. The increase in the possible coverage area is done in a manner that allows the full capacity to be allocated to any one of the N beams. Return Link capacity can be distributed in any proportion across the N beams within a beam group by proper selection of the attenuators values $A_1$ through $A_N$. The attenuation values $A_1$ through $A_N$ may be set using, for example, short messages from a ground-based controller.

Antenna directivity and the LNA 314 determine the base G/T of a particular beam. G/T is a ratio of gain of the satellite 306 to a thermal noise temperature of the satellite 306. The G/T may be denoted as $(G/T)_n$ for beam number n. Summing outputs of each of the LNA's 314a, 314b, . . . 314N after attenuation will increase a level of noise and thus decrease an effective beam G/T. The resulting or effective G/T for each beam can be determined as a function of the N attenuator settings. Generally, since satellite Rx antennas are directed towards Earth, they will have an antenna temperature of about 290K. The LNA's 314a, 314b, . . . 314N may be similar and have about the same noise figure. Thus, the input referred system temperature may be about the same at the input to each LNA 314 and will be about $T_{sys}=T_{Ant}+T_{LNA}$. If all LNA's 314a, 314b, . . . 314N have the same gain ($G_{LNA}$), then the noise temperature at the output of the combiner can be given by the equation:

$$T_{out} = T_{sys}\left(\frac{G_{LNA}}{A_1} + \frac{G_{LNA}}{A_2} + \ldots + \frac{G_{LNA}}{A_N}\right) \quad (1)$$

In practice, the LNA's 314a, 314b, . . . 314N may not have precisely the same gain. This is easily accounted for by measuring the LNA gain during the manufacturing process. The gain imbalance can be compensated for using the programmable attenuators 330a, 330b, . . . 330N. Thus, the programmable attenuators 330a, 330b, . . . 330N will have two components to their attenuation value, a component for LNA gain compensation and a component to allocate capacity amongst the N beams. As used herein, the attenuation values $A_1$ thorough $A_N$ will represent only the second component.

The gain of the Rx antennas 312a, 312b, . . . 312N and electronics to the output of the summing device for beam n can be given by:

$$(G_{ANT})_n \cdot G_{LNA}/A_n \quad (2)$$

Thus, the effective G/T for beam n is:

$$\left(\frac{G}{T}\right)_n^{eff} = \frac{(G_{ANT})_n G_{LNA}}{A_n} \cdot \frac{1}{T_{out}} \quad (3)$$

$$= \frac{(G_{ANT})_n}{A_n} \cdot \left[T_{sys}\left(\frac{1}{A_1} + \frac{1}{A_2} + \ldots + \frac{1}{A_N}\right)\right]^{-1}$$

Noting that $(G_{ANT})/T_{sys}$ is a base G/T of beam number n, equation (3) can be expressed in a convenient form as:

$$\left(\frac{G}{T}\right)_n^{eff} = \left(\frac{G}{T}\right)_n \cdot \frac{A_p}{A_n} = \left(\frac{G}{T}\right)_n \cdot \alpha_n \quad (4)$$

where $A_p$ is a parallel combination of all N attenuator values:

$$A_p = \left(\frac{1}{A_1} + \frac{1}{A_2} + \ldots + \frac{1}{A_N}\right)^{-1} \quad (5)$$

In equation (4), $\alpha_n$ is a G/T weighting or reduction for beam n. A sum of all $\alpha_n$ values should equal 1. From equation (4) it can be seen that the effect of the attenuation values is to distribute the G/T reduction across the beams within the beam group according to the weight $\alpha_n$. When all attenuation values are set to the same value ($\alpha_n=A$), then $A_p=A/N$, and thus $\alpha_n=1/N$ for all beams. This results in equal reduction of G/T across all beams in the beam group. This may seem undesirable, but note that the effective coverage area has now increased by a factor of N (for N equal size beams), so the G/T must necessarily decrease by the same factor. Hence, the reduction is an artifact of the increased coverage area.

When $A_n$ is set to unity and all other attenuator values are set to a very large attenuation, $\alpha_n=1$ and all other values of the G/T weighting are extremely small (nearly zero). Thus, beam n has essentially no G/T reduction and all other beams have a large G/T reduction. This situation corresponds to turning beam number n "on" and all other beams "off".

For an arbitrary set of selected G/T reductions $\alpha_1 \ldots \alpha_N$, corresponding attenuation values can be determined as follows. First, set $B_n=1/\alpha_n$. Then, set $A_n=B_n/B_{min}$, where $B_{min}$ is a minimum of all $B_n$ values. This will insure than all values of $A_n$ are greater than or equal to unity and provide desired values for $\alpha_1 \ldots \alpha_N$.

In the return link of a hub-spoke satellite communications system, the end to end signal-to-noise ratio (SNR) is usually dominated by the uplink SNR. The uplink SNR may be proportional to the satellite G/T, and thus the uplink SNR's in each of the beams in the beam group may be proportional to the values selected for $\alpha_n$. The capacity of the link can be determined from Shannon's capacity equation:

$$C=W \cdot \text{Log}_2(1+SNR) \quad (6)$$

From this it can be seen that the capacity can be distributed across the beams in the beam group in any proportion desired by the proper selection of the G/T reductions factors $\alpha_1, \ldots \alpha_N$.

Since all beams may use the same spectrum, the system described works best when the N beams within a beam group are spatially isolated. Failure to do so may result in a multipath situation where the uplink transmission from a UT finds multiple paths through two or more different beams to the combiner circuitry. The multiple paths can result in destructive cancellation of the desired signal when a phase differential nears 180 degrees. When the beams within a beam group are spatially separated, the secondary and subsequent paths are significantly attenuated relative to the primary path. In this scenario, the signal cancellation will be small or non-existent.

In embodiments where all beams in a beam group use the same spectrum, multiple access must be coordinated across the beams. Multiple access across a beam group can be performed the same way as return link multiple access within a single beam. UT's can transmit at different times (TDMA) or on different frequencies (FDMA) within the beam spectrum. It may be convenient to view the N beams in a beam group as a single large non-contiguous beam. Multiple access and link management techniques that apply for conventional single beams can be applied.

Figure 4A:
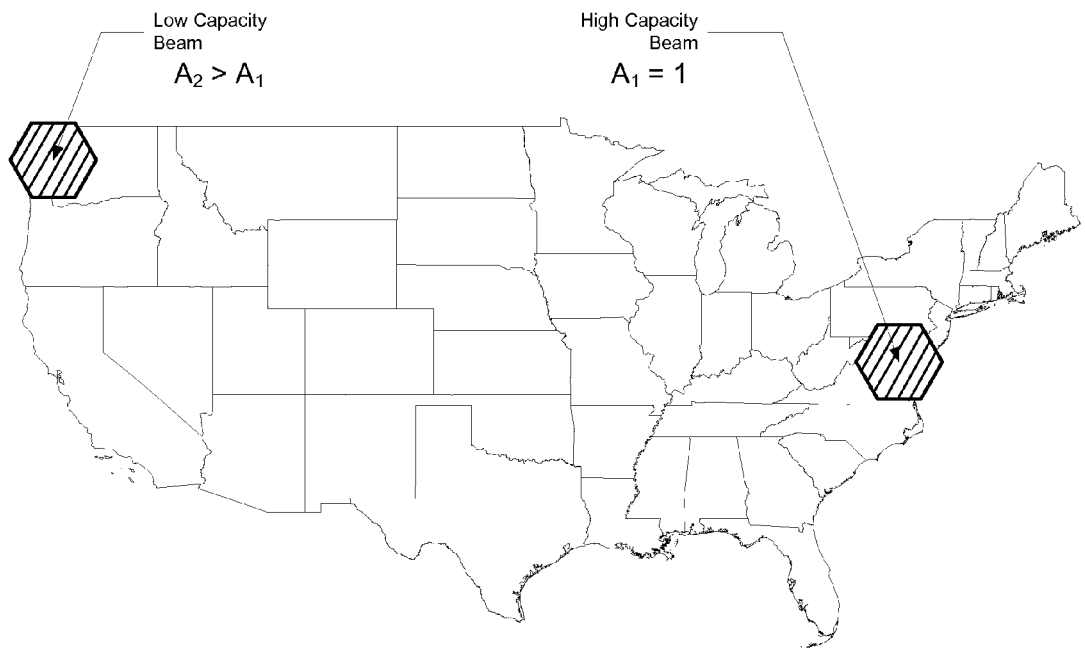
FIGS. 4A-4B are simplified diagrams illustrating beam capacity adjustments according to an embodiment of the present invention.
Figure 4B:
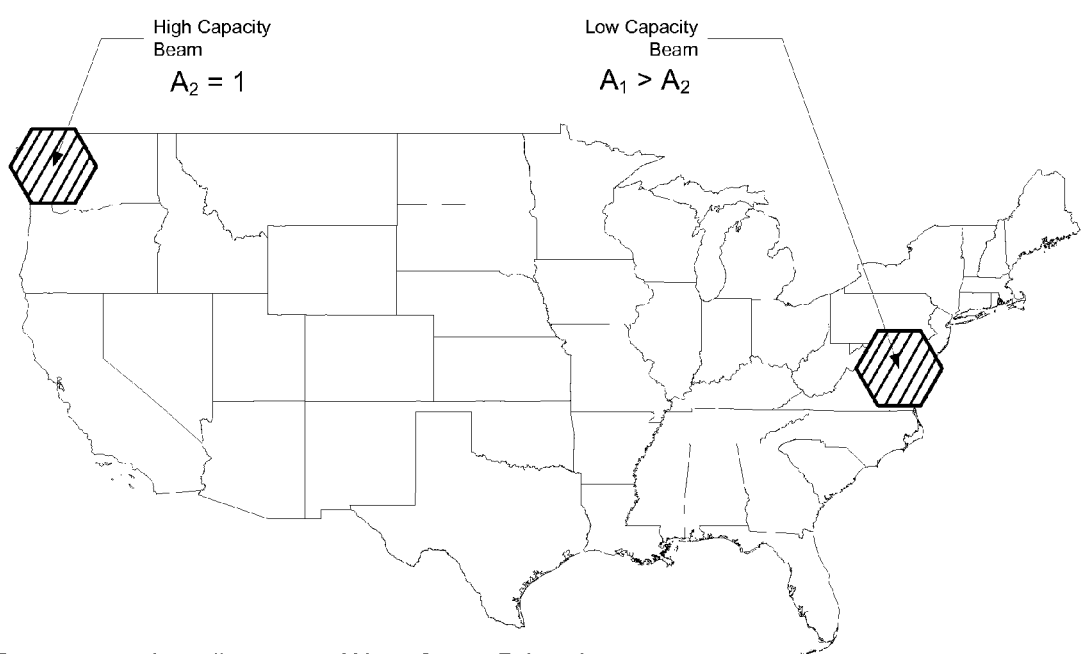

FIGS. 4A-4B are simplified diagrams illustrating beam capacity adjustments according to an embodiment of the present invention. FIG. 4A illustrates beam capacity adjustment for East Coast Primetime according to an embodiment. A high capacity beam and a low capacity beam are shown as individual beams included within a single beam group spanning the continental United States. Only these two representative beams are shown in the figure, but other beams may exist in the same beam group. The high capacity beam is associated with a coverage area located along the East Coast. On the other hand, the low capacity beam is associated with a coverage area located along the West Coast. This corresponds with the usage of bandwidth during what are peak hours for the East Coast and non-peak hours for the West Coast.

FIG. 4B illustrates beam capacity adjustment for West Coast Primetime according to an embodiment. This figure is similar in many respects to FIG. 4A. However, the locations of the high capacity beam and low capacity beam have swapped. Now, the high capacity beam is associated with a coverage area located along the West Coast. The low capacity beam is associated with a coverage area located along the East Coast. This corresponds with the usage of bandwidth during what are peak hours for the West Coast and non-peak hours for the East Coast.

The high capacity beam and the low capacity beam may be realized by remotely controlling attenuators aboard the spot beam satellite, in the manner described previously. For example, the high capacity beam may result from setting a corresponding attenuator $A_1$ at a relatively low attenuation value (e.g., $A_1=1$). At the same time, the low capacity beam may result from setting a corresponding attenuator $A_2$ at a relatively high attenuation value (e.g., $A_2>A_1$). The high capacity beam has greater power and thus more potential capability for data transmission. The low capacity beam has lower power and thus less potential capability for data transmission. In either case, use of adaptive modulation and coding (ACM) allows for efficient use of the available capacity.

FIGS. 4A-4B thus portray the manner in which capacity may be flexibly allocated among spot beams based on usage patterns. When it is East Coast Primetime, the spot beam satellite may be configured to provide spot beams as illustrated in FIG. 4A. A few hours later, when it is West Coast Primetime, the spot beam satellite may be configured differently, to provide spot beams as illustrated in FIG. 4B. One of ordinary skill in the art would recognize may variations, modifications, and alternatives in light of the present disclosure.

It should be noted that the methods and apparatuses discussed throughout this specification are provided merely as examples. Various embodiments may omit, substitute, or add various procedures or components as appropriate. For instance, it should be appreciated that features described with respect to certain embodiments may be combined in various other embodiments. Also, measurements can be made and the various values provided in any units. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

Having described several embodiments, it will be recognized by those of skill in the art that various modifications, alternative constructions, and equivalents may be used without departing from the spirit of the invention. For example, the above elements may be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for providing flexible coverage areas for return link spot beam signals in a spot beam satellite communication system, the method comprising:

receiving a plurality of return link spot beam signals, each from a spot beam corresponding to a different spot beam coverage area;

selectively attenuating at least one of the plurality of return link spot beam signals to modify a distribution of capacity between at least two of the plurality of return link spot beam signals;

after the step of selectively attenuating, summing the plurality of return link spot beam signals, to generate a combined spot beam signal;

amplifying the combined spot beam signal to generate an amplified spot beam signal; and transmitting the amplified spot beam signal to a gateway.

2. The method of claim 1 wherein the step of selectively attenuating is achieved by remotely controlling attenuation values from a location away from the spot beam satellite, after the spot beam satellite has been deployed in space.

3. The method of claim 2 wherein the attenuation values are adjusted in response to predicted offered load.

4. A spot beam satellite for providing flexible coverage areas for return link spot beam signals, comprising:

one or more antennas configured to receive a plurality of return link spot beam signals, each from a spot beam corresponding to a different spot beam coverage area;

one or more programmable attenuators configured to attenuate at least one of the plurality of return link spot beam signals to modify a distribution of capacity between at least two of the plurality of return link spot beam signals;

a summing device configured to combine the plurality of return link spot beam signals to generate a combined spot beam signal;

an amplifier configured to amplify the combined spot beam signal to generate an amplified spot beam signal; and a transmitter configured to transmit the amplified spot beam signal to a gateway.

5. The spot beam satellite of claim 4 further comprising:

a receiver configured to receive attenuation values from a location away from the spot beam satellite; and a processor configured to set an attenuation of the one or more programmable attenuators based on the attenuation values.

6. The spot beam satellite of claim 4 wherein the one or more programmable attenuators are controlled to respond to predicted offered load.

* * * * *